(12) United States Patent
Eisenmenger

(10) Patent No.: US 6,212,782 B1
(45) Date of Patent: Apr. 10, 2001

(54) BUILDING LINE LAYOUT DEVICE

(76) Inventor: Gary W. Eisenmenger, 4503 Fox Run Rd., Louisville, KY (US) 40207

( * ) Notice: Subject to any disclaimer, the term of this patent is extended or adjusted under 35 U.S.C. 154(b) by 0 days.

(21) Appl. No.: 09/175,789

(22) Filed: Oct. 20, 1998

(51) Int. Cl.$^7$ .................................................. G01C 15/00
(52) U.S. Cl. .............................. 33/1 G; 33/339; 33/285; 33/413
(58) Field of Search ................... 33/1 G, 1 H, 1 LE, 33/281, 285, 293, 421, 424, 501, 413, 407, 408, 409, 756, 430, 431, 339

(56) References Cited

U.S. PATENT DOCUMENTS

| | | | |
|---|---|---|---|
| 147,472 | * 2/1874 | Bogy | 33/1 H |
| D. 337,279 | * 7/1993 | Styles et al. | D10/69 |
| D. 357,195 | * 4/1995 | Palacio et al. | D10/71 |
| 2,586,074 | * 2/1952 | Memluck | 33/1 LE |
| 3,129,514 | * 4/1964 | Lintner | 33/1 H |
| 3,462,843 | 8/1969 | Blake | 33/1 |
| 3,803,721 | 4/1974 | Matsui | 33/283 |
| 3,828,443 | 8/1974 | James | 33/227 |
| 3,879,132 | * 4/1975 | Myeress | 33/1 H |
| 3,967,381 | * 7/1976 | Chesbro | 33/1 H |
| 3,979,833 | 9/1976 | Grundman | 33/138 |
| 4,095,343 | 6/1978 | McPhail | 33/1 LE |
| 4,476,635 | * 10/1984 | Hart | 33/228 |
| 4,669,195 | * 6/1987 | Griffin | 33/339 |
| 4,924,579 | 5/1990 | Berendsen | 33/1 LE |
| 5,107,595 | * 4/1992 | Stay et al. | 33/1 G |
| 5,117,560 | 6/1992 | Nevins | 33/471 |
| 5,142,787 | * 9/1992 | Dadisman | 33/1 G |
| 5,232,536 | * 8/1993 | Oshiro et al. | 156/295 |
| 5,402,226 | 3/1995 | Matthews | 33/285 |
| 5,473,819 | * 12/1995 | Byers et al. | 33/339 |
| 5,621,976 | * 4/1997 | Ochsenbine | 33/339 |
| 6,141,880 | * 11/2000 | Vircks | 33/1 G |

\* cited by examiner

Primary Examiner—Diego Gutierrez
Assistant Examiner—Maria Fernandez

(57) ABSTRACT

A device for the measurement/layout of angles when using surveyor's stakes to locate reference points and erect building lines for construction of a structure. Capable of being used to determine one angle at a time for non-regular polygons, or for the simultaneous determination of multiple angles for the layout of regular polygons such as hexagons and octagons, this device provides a greatly simplified solution to the very first problem in construction, which is how to effect the layout.

2 Claims, 5 Drawing Sheets

BUILDING LINE LAYOUT DEVICE

BACKGROUND OF THE INVENTION

Prior to any building project it is necessary to first establish the building lines. This is accomplished by driving stakes into the ground to locate corners or other reference points of the proposed structure. These stakes are then connected with string to form the building lines which represent the shape of the structure. The stakes, and thus the building lines, must be placed relative to each other at specific angles. The current state of the art includes a variety of devices for determining the measurement/layout of angles, however, they are limited by their ability to only measure/layout one angle at a time before the device must be somehow moved or set up again for the next angle. While this method of layout is standard procedure for the layout of non-regular polygons, a device capable of laying out multiple equal angles, as are found in regular polygons such as hexagonal and octagonal structures, and to do so simultaneously with only one setup of the device, is lacking in the current state of the art. Even transits, which could be used to achieve the layout of a regular polygon, require repetitive movement of the telescope so that one angle at a time may be laid out. The importance of this "one set-up" capability lies in the fact that any additional set-ups/movements required of a survey device greatly increase the possibility of error in the layout. This is particularly true for "do-it-yourselfers" and others who may lack specific skills in the use of surveying instruments.

The objective of the present invention then is to provide an inexpensive device for simplifying the layout of both single and multiple angles when constructing building lines, thus making it possible for both the skilled, and the semi-skilled worker to layout shapes of structures that otherwise would prove too complicated.

SUMMARY OF THE INVENTION

As stated, the primary objective of the present invention is to simplify the process wherein stakes driven into the ground must be located relative to one another at specific angles when starting a building project. The present invention achieves this objective by utilizing a circular disc like template having about its circumference various scales designed to aid in the layout of any angle within the 360 degrees of the circle, as well as a variety of geometric shapes which can be laid out when using the disc as a central point-of-beginning.

To layout a rectangle for a building project two stakes are first driven into the ground and nails driven into them to locate two points in a line. A string is then tied from nail to nail establishing a straight line. This stringline will serve as a baseline for one side of the rectangle. The disc is then placed over the nail on top of one of the stakes, it is held stationary by a bifurcated projection which straddles the stringline thus keeping the disc from turning. A second string is then attached to the nail, which is now in the center of the disc, and pulled to the desired angle relative to the baseline by lining it up over one of the 360 degree marks located about the circumference of the disc. In the case of the rectangle, this would be 90 degrees. The disc is then moved to another stake and the process repeated until all four sides of the rectangle have been staked. More than one disc can be used to further expedite the process.

To layout a hexagon, strings are attached to the nail in the center of the disc and pulled over each of 6 reference marks located in a circular pattern on the top side of the disc. Measuring equal distances on each of the six strings emanating from the center of the disc will allow the layout of any size hexagon desired. The same process can be followed for a variety of other geometric shapes marked on the disc.

DETAILED DESCRIPTION OF THE INVENTION

Figure 1:
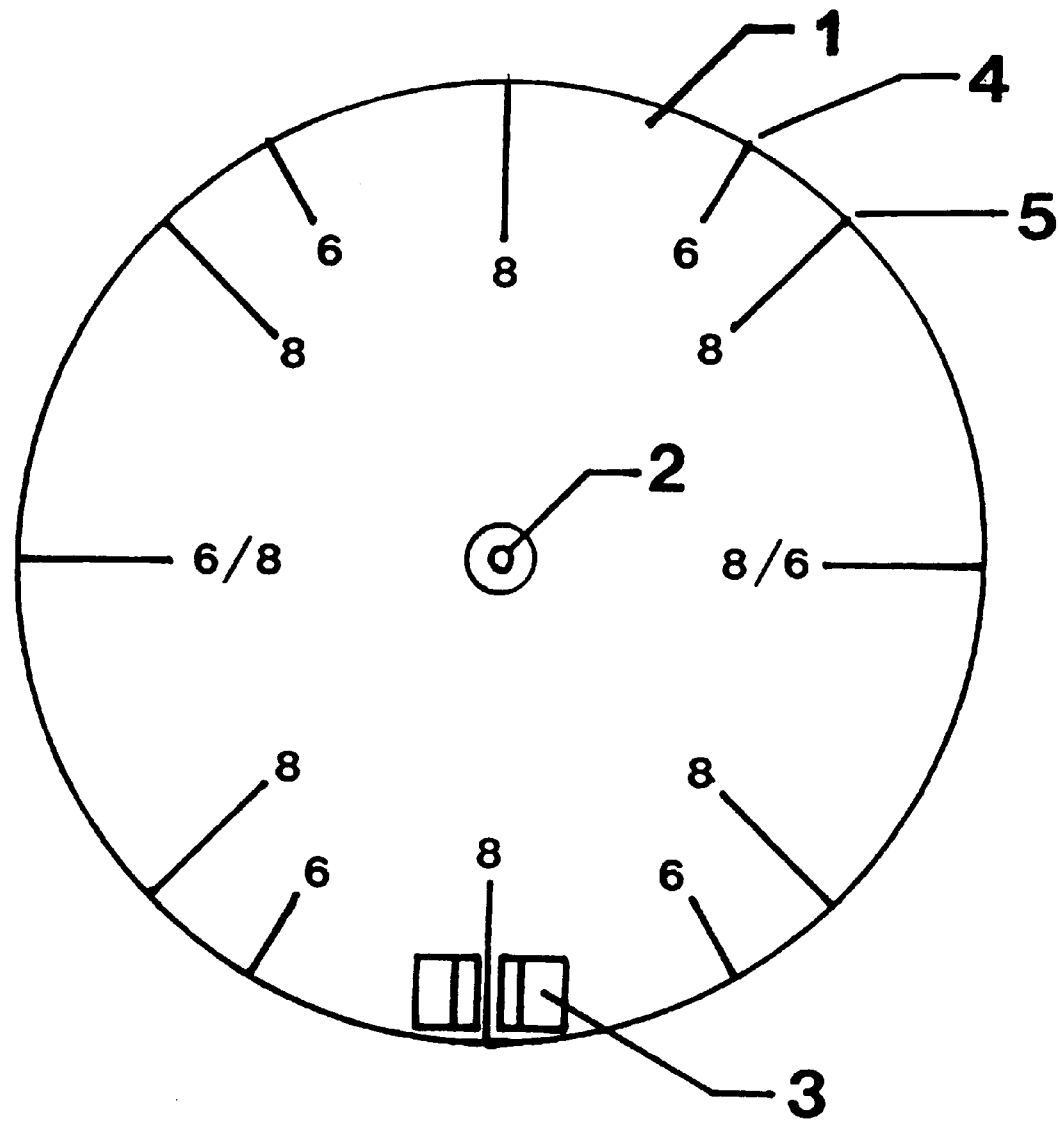
FIG. 1 is a view of side one of the disc depicting a possible arrangement of layout marks for creating hexagonal (6 sided) and octagonal (8 sided) polygons. Also shown in this view is the bifurcated projection at the edge of the disc which locks the disc onto a baseline and keeps it from rotating.
Figure 2:
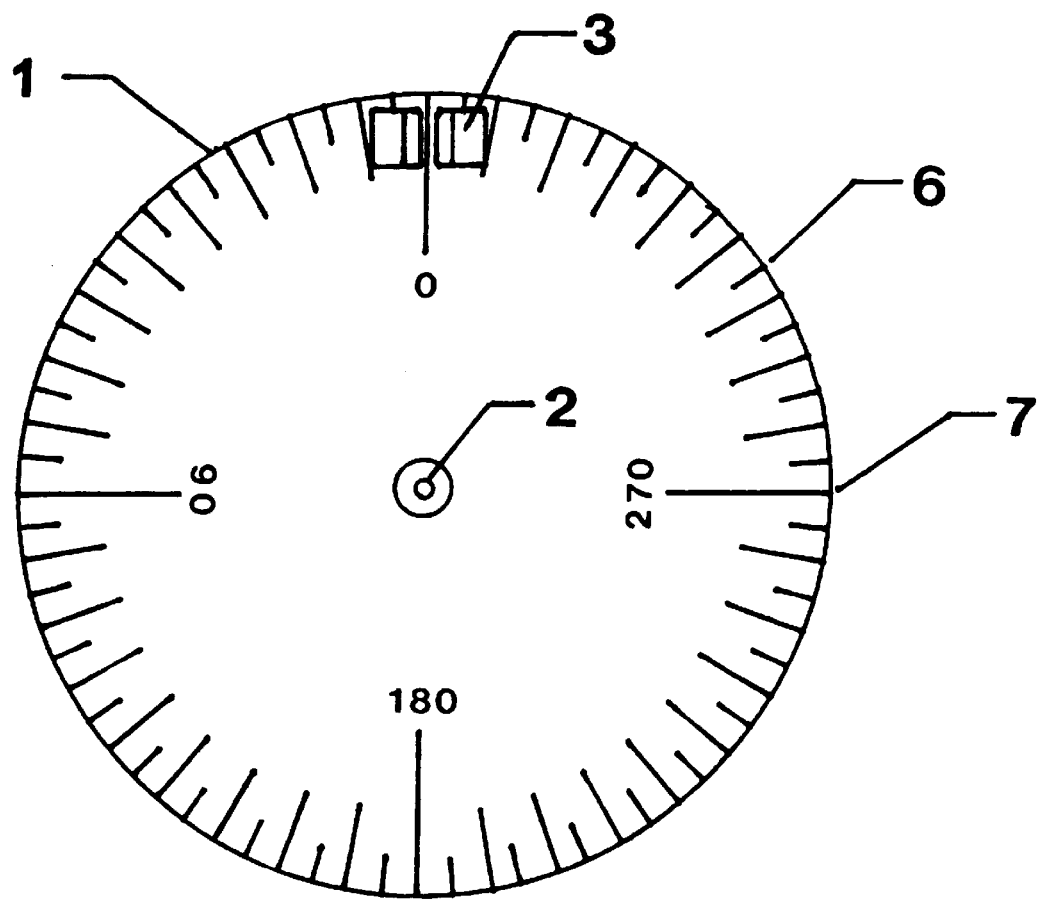
FIG. 2 is a view of side two of the disc depicting another arrangement of graduated marks for laying out any degree of angle in a 360 degree circle. In this illustration the quadrant marks of the circle are indicated as well. This side of the disc also has a bifurcated projection to lock the disk in position on a baseline.
Figure 3:
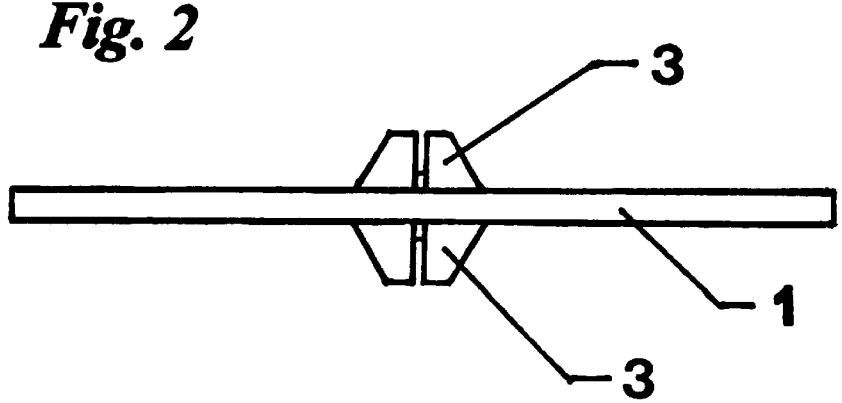
FIG. 3 is a view of the edge of the disc which depicts the bifurcated projections which serve to lock the disc in position on a base stringline. Being opposite one another they aid in maintaining the balance of the disc.

Referring to drawing FIGS. 1–6. In FIG. 1 is shown one side of the disc (1). In the center of the disc is a hole (2) whereby the disc (1) Is attached to a nail driven into a surveyors stake. Also shown is the bifurcated projection (3) which locks the disc onto a stringline and keeps it from rotating. For the sake of clarity this bifurcated projection (3) is illustrated in FIG. 3 in an elevation view of the disc (1). Referring now back to FIG. 1 the disc is shown to have one of its two sides graduated into a series of marks designed to aid in the layout of polygons, in this case the marks used to form a hexagon are marked with the numeral 6 (4), the marks used to form an octagon are marked with the numeral 8 (5).

FIG. 2 illustrates the opposing side of the disc (1) which has its circumference graduated into increments of 5 degrees (6) and each of the 4 quadrants marked clearly at 90 degrees (7). This side of the disc (1) is used to locate any angle within the 360 degrees of the circle. This side of the disc is also used to layout rectangular structures requiring 90 degree corners.

Figure 4:
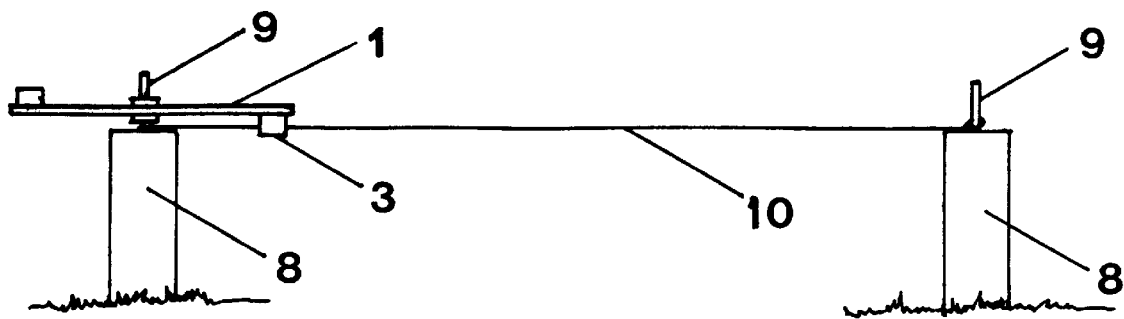
FIG. 4 is an elevation view of how the disc appears when in position upon a surveyor's stake and attached to a baseline formed by a string pulled taut between two stakes.
Figure 4A:
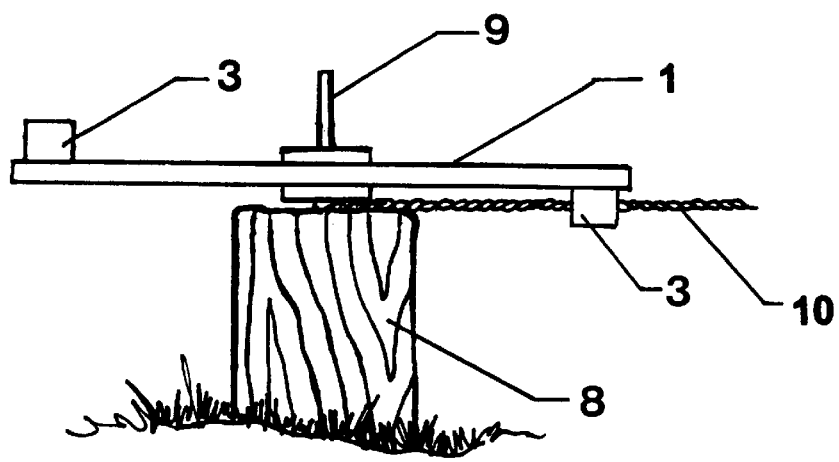
FIG. 4a is close up view of the disc in position upon a surveyor's stake.

To use the disc (1) in laying out any angular shaped object one must follow the procedure as shown in FIG. 4. First, two surveyor's stakes (8) are driven into the ground to establish a baseline for the layout. Nails (9) are then driven into the top of the surveyor's stakes (8). A stringline (10) is then pulled taut and tied to form the baseline from which any angle may be measured. Once the baseline is established the disc (1) is attached to the nail (9) by placing the disc (1) over the nail (9) and letting the nail (9) project through the hole (2) located in the center of the disc (1). and the bifurcated projection (3) is positioned so as to straddle the stringline (10) thus locking the disc into position and keeping it from rotating. The disc (1) is now in position to determine any angle relative to the baseline. A close-up view of the disc (1) attached to the surveyor's stake (8) is shown in FIG. 4a.

Figure 5:
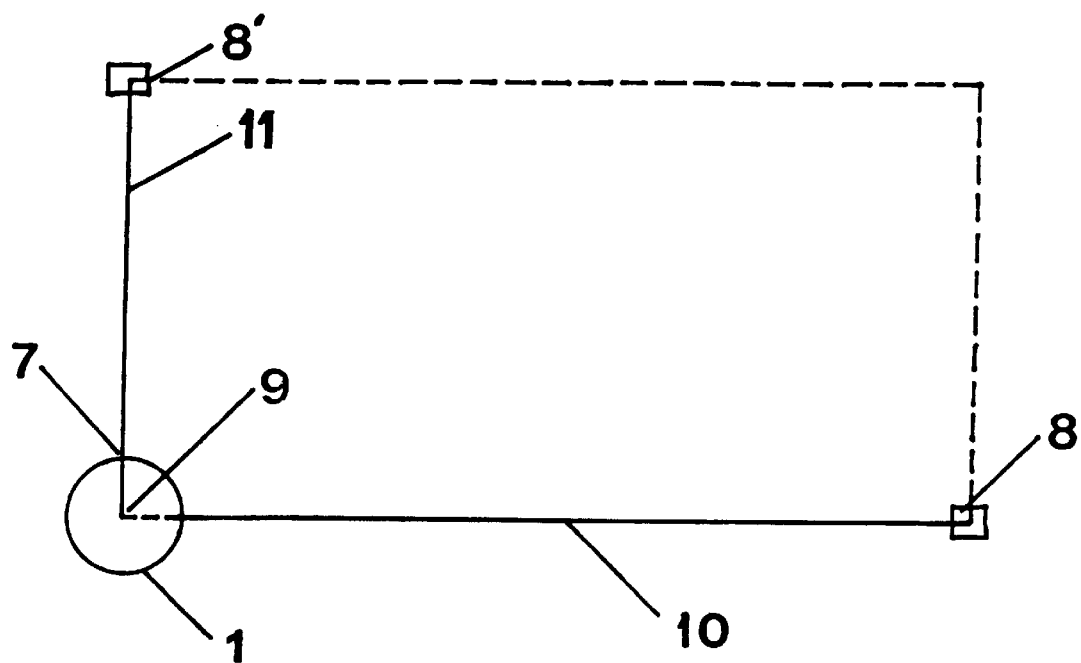
FIG. 5 is a plan view of how the disc appears when used to layout a rectangular structure.

Use of the disc to layout a rectangular structure is shown in FIG. 5. The disc (1) is placed in position on a baseline (10). While locked in position on the baseline (10) the graduations marking the 90 degree quadrants (7) on the disc are used to locate a new stringline (11) 90 degrees to the baseline. This is done by attaching the new stringline (11) to the same nail (9) to which the disc (1) is attached, aligning the stringline (11) over the predetermined degree mark (6) on the disc (1), pulling the stringline (11) taut, and driving a new stake (8') to hold the position of the new stringline (11) thus laying out the desired angle. To complete the layout, the disc is moved to another stake and the process repeated, or, more than one disc may be used.

Figure 6:
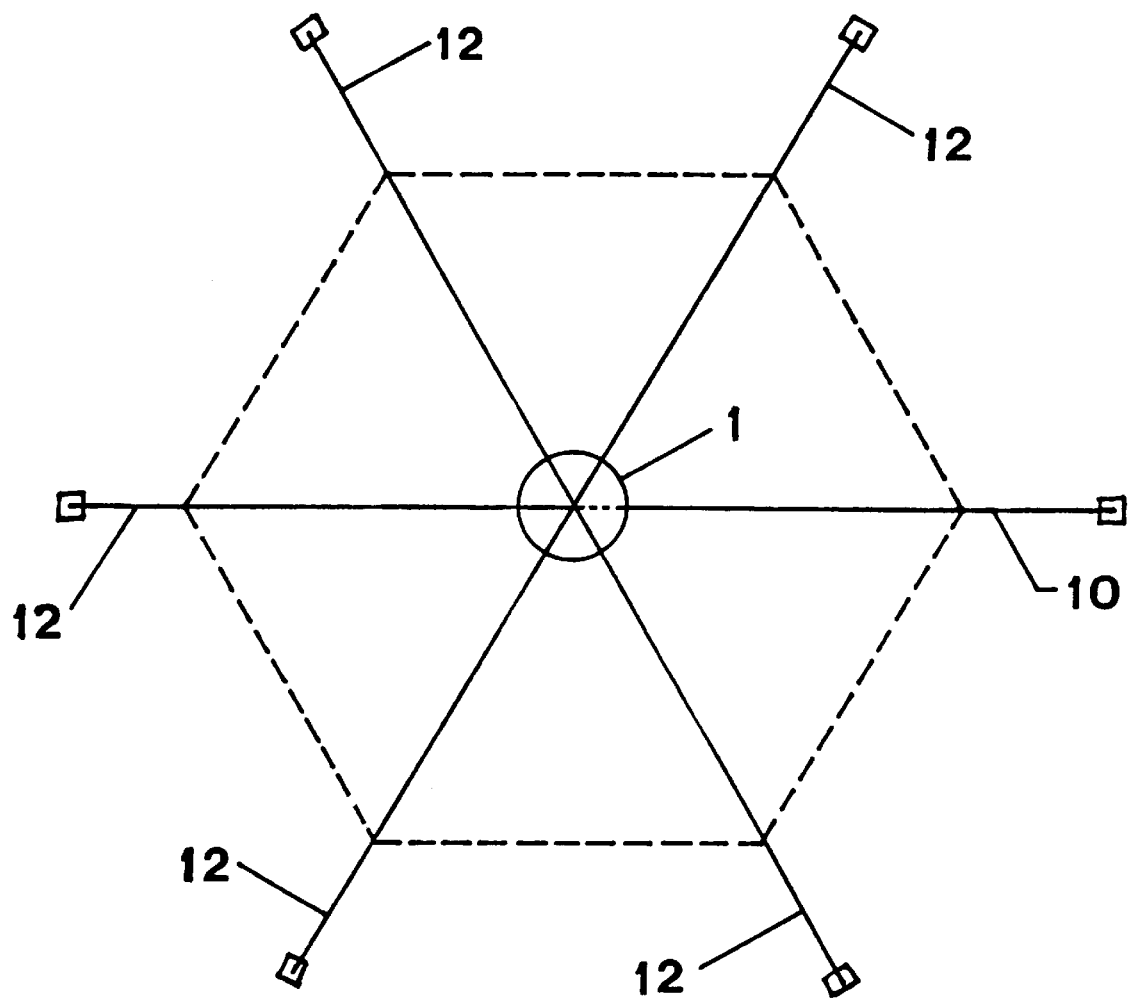
FIG. 6 is a plan view of how the disc appears when used to locate points to build a hexagonal structure.

Use of the disc to layout a regular polygon is shown in FIG. 6. Once again a baseline (10) is established. The disc (1) is placed over one of the stakes forming the baseline in what will be the center of the polygon. The other angles are marked by emanating a series of stringlines (12) from the nail located in the center of the disc (1). By measuring equal distances on the stringlines (12) from the center of the disc, any size regular polygon may be accurately laid out, as shown by the hexagon in the drawing.

While the present invention has been particularly shown and described in reference to preferred embodiments thereof, it will be understood by those skilled in the art that changes in the form and details may be made therein without departing from the spirit and scope of the invention. As such, it is intended that the present invention only be limited by the terms of the appended claims.

What is claimed is:

1. A method for simplifying the layout of angles for building lines in the field to construct a multiplicity of geometric shapes comprising the following steps:
   a. constructing a baseline, said baseline comprising two surveyor's stakes driven into the earth, each of said stakes having a nail-like projection extending from its uppermost end, and a taut stringline attached at each of its two ends to said nail-like projections,
   b. releasably attaching a template, in a generally horizontal position, to said nail-like projection located on the uppermost end of one of said surveyor's stakes and above said baseline, said template being a generally flat circular disk having two sides usable for the layout of building lines, a first side comprising a template having markings about its circumference indicating angular graduations by degrees wherein said markings provide means for measuring angles relative to said baseline, a second side comprising a template for the layout of regular polygons containing indicia about its circumference giving the interior angles for a plurality of regular polygons wherein said indicia provide means for guiding the user in the location of said angles for the layout of said polygons, said disk further comprising a hole of predetermined diameter located in the center of said disk to provide means for reversable and releasable attachment to said nail-like projection, wherein said hole allows said disk to be lowered onto said nail-like projection, when combined with said disk said nail-like projection, being relatively small in diameter, further provides attachment means for stringlines to the center of said template, thus forming the vertex for all angles measured therefrom, said disk further comprising means for releasably locking said disk in a non-rotatable position while attached to said nail-like projection on said surveyor's stake, wherein said locking means comprises a bifurcated projection located on the outer edge of said disk and projecting perpendicular to said disk, said bifurcated projection having such distance between its parts as to allow said bifurcated projection to straddle said baseline thus rendering said disk fixed in position relative to said baseline, while remaining independent of, and thus removable from, said baseline,
   c. releasably locking said template in a non-rotatable position relative to said baseline while in position upon said surveyor's stake by placing said baseline through the slot in said bifurcated projection wherein the original attachment of said baseline to said nail-like projections upon said stakes is unaffected,
   d. attaching one or more stringlines to said nail-like projection to which said template is attached upon said stake, whereupon said stringline(s) are pulled taut and located in accordance with the desired indicia on said template, thus forming the desired angle(s) for layout relative to said baseline,
   e. unlocking said template from a non-rotatable position relative to said baseline, or removing said template from said surveyor's stake completely upon completion of use, by lifting said disk off of said nail-like projection, thus releasing the baseline from said bifurcated projection and said disk from said nail-like projection, wherein the original attachment of said baseline to said nail-like projections upon said stakes is unaffected.

2. A device for simplifying the layout of angles to construct a multiplicity of geometric shapes, comprising:
   a. a generally flat, rigid, circular disk of predetermined thickness and diameter, said disk having two templates usable for the layout of geometric shapes, a first template for the layout of a single angle or a multiplicity of angles sharing a common vertex, having predetermined graduations about its circumference marked in degrees, said graduations providing means for measuring angles relative to a baseline, said baseline being a stringline pulled taut between two nail-like projections, a second template being for the layout of regular polygons, having indicia about its circumference giving the location of the interior angles for a plurality of regular polygons, said indicia providing means for guiding the user in locating said angles for layout of said polygons,
   b. said disk further comprising a hole of predetermined diameter located in the center of said disk to provide means for reversable and releasable attachment of said disk to a nail-like projection, wherein said hole allows said disk to be lowered onto said nail-like projection, when combined with said disk said nail-like projection, being relatively small in diameter, further provides attachment means for stringlines to the center of said template, thus forming the vertex for all angles measured therefrom,
   c. said disk further comprising means for releasably locking said disk in a non-rotatable position while attached to said nail-like projection wherein said locking means comprises a bifurcated projection located on the outer edge of said disk and projecting perpendicular to said disk, said bifurcated projection having such distance between its parts as to allow said bifurcated projection to straddle a taut stringline thus rendering said disk fixed in position relative to said stringline, while remaining independent of, and thus removable from, said stringline.

\* \* \* \* \*